United States Patent
Bravo Corbacho et al.

(10) Patent No.: US 12,485,833 B2
(45) Date of Patent: Dec. 2, 2025

(54) RETRACTABLE CAMERA WING ASSEMBLY FOR VEHICLES

(71) Applicant: FicoMirrors, S.A.U., Barcelona (ES)

(72) Inventors: David Bravo Corbacho, Viladecavalls (ES); Robert Lopez Galera, Viladecavalls (ES)

(73) Assignee: FICOMIRRORS, S.A.U., Barcelona (ES)

(*) Notice: Subject to any disclaimer, the term of this patent is extended or adjusted under 35 U.S.C. 154(b) by 271 days.

(21) Appl. No.: 18/295,952

(22) Filed: Apr. 5, 2023

(65) Prior Publication Data

US 2023/0331174 A1 Oct. 19, 2023

(30) Foreign Application Priority Data

Apr. 13, 2022 (EP) ..................................... 22382354

(51) Int. Cl.
| | |
|---|---|
| *B60R 11/04* | (2006.01) |
| *B60R 1/26* | (2022.01) |
| *H04N 23/54* | (2023.01) |
| *B60Q 1/00* | (2006.01) |
| *B60R 11/00* | (2006.01) |

(52) U.S. Cl.
CPC ............... *B60R 11/04* (2013.01); *B60R 1/26* (2022.01); *H04N 23/54* (2023.01); *B60Q 1/0023* (2013.01); *B60R 2011/0082* (2013.01); *B60R 2011/0085* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 8,801,245 B2* | 8/2014 | De Wind | B60Q 1/2696 |
| | | | 455/420 |
| 10,343,621 B2* | 7/2019 | Brouwer | G03B 17/04 |
| 2017/0341596 A1* | 11/2017 | Thompson | H04N 7/183 |
| 2019/0009735 A1* | 1/2019 | Ahn | B60R 11/04 |
| 2020/0238910 A1* | 7/2020 | Wilson | H04N 7/18 |
| 2023/0211740 A1* | 7/2023 | LaCross | B60R 1/12 |
| | | | 348/148 |

* cited by examiner

*Primary Examiner* — Rodney E Fuller
(74) *Attorney, Agent, or Firm* — CANTOR COLBURN LLP (57) ABSTRACT

A retractable camera wing assembly for vehicles includes: a casing adapted to be mounted in a vehicle and provided with a camera for capturing rear view imagines. The casing is pivotable about a pivot axis, and it has a first part extending and a second part, such first and second parts diverge from each other. The camera is placed at the second part of the casing, and the first part of the casing is fitted with at least one electric and/or electronic device. In a driving position, the second part is deployed externally from the vehicle's surface, and in a parking position the second part is concealed, and the first part of the casing protrudes externally from the vehicle's surface. Also disclosed herein is a vehicle incorporating the retractable camera wing assembly.

20 Claims, 7 Drawing Sheets

FIG. 6B ions Serial No. 22382354.3 filed Apr. 13, 2022, the disclosure of which is incorporated herein by reference in its entirety.

RETRACTABLE CAMERA WING ASSEMBLY FOR VEHICLES

CROSS-REFERENCE TO RELATED APPLICATIONS

This application claims the benefit of European Application Serial No. 22382354.3 filed Apr. 13, 2022, the disclosure of which is incorporated herein by reference in its entirety.

BACKGROUND

The present invention relates in general to external rear view camera assemblies for Camera Monitoring System (CMS).

An object of the invention is the provision of a retractable wing assembly integrating a rear-view camera that provides additional functional features to a vehicle in the parking position, such as: a courtesy lamp, logo light or any other functional device that could be operative in parking position.

The invention also refers to a vehicle incorporating the retractable camera wing assembly.

SUMMARY

Camera Monitoring System (CMS) is an alternative to traditional rear-view mirrors that provides a driver with a rear-view image on a display during normal driving conditions along a road. In this systems, traditional rear-view mirrors are replaced by external cameras located at both sides of the vehicle, placed each camera in a so-called camera wing or camera winglet.

There is a continuous interest in improving these products to incorporate additional functionalities.

The invention is defined in the attached independent claims.

As aspect of the invention refers to a retractable camera wing assembly for vehicles, wherein the assembly comprises a casing adapted to be mounted in a vehicle and to be operated to move between a deployed or driving position for capturing rear-view imagines while driving the vehicle, and a parking position when the vehicle is parked in which a part of the casing is concealed inside the vehicle.

The casing is configured to be pivotable about a pivot axis about which the casing is rotatable when the casing is operatively mounted in the vehicle, to transit between the driving and parking positions. Preferably, the assembly is configured such that the rotation angle of the casing is within the range between 20° and 45° for passing from parking to driving position.

The casing has a first part that extends in a first direction (or first axis) from the pivot axis, and a second part that extents in a second direction (or second axis), different from the first direction, from the pivot axis, such first and second parts diverge from each other in different directions. First and second directions are generally coplanar, so that the general shape of the casing resembles an "L" or an angled body.

The casing including first and second parts, can be implemented as a single piece or with several pieces assembled together.

Preferably, first and second parts are arranged such that they define an angle (α) within the range 100°-170°, that is, first and second axis along which the first and second parts extend, define an angle within said range.

The assembly is provided with a camera placed at the second part of the casing, for capturing rear view images when the assembly is deployed in the driving position. Preferably, the camera is installed at the most distant surface of the second part with respect to the pivot axis, and it is externally visible.

The assembly may be configured, such that the second part in the driving position protrudes from the vehicle body at most 250 mm.

In addition, the assembly is fitted with at least one electric and/or electronic device, such as: a lighting device, a camera, a radar, a lidar, a laser, a sensor, an assistance system for avoiding accidents between vehicles and vulnerable road users, or an antenna, located in a first part of the casing, preferably at the surface of the assembly closest to ground when installed in a vehicle, and preferably visible With the above-described assembly of components, when the assembly is operatively mounted in a vehicle, in the driving position, a portion of the second part of the casing in which the camera is located, is deployed externally from the vehicle's surface, so that the camera is operational, and it is positioned for capturing rear view images for assisting a driver to drive the vehicle.

In the parking position, the second part of the casing in which the camera is located, is at least partially concealed in the opening and the camera is not operational, but the first part of the casing in which the electric and/or electronic device is located, protrudes externally from the vehicle's surface, and the electric and/or electronic device is operational. In the driving position, preferably, the operation of the electric and/or electronic device is disabled.

Consequently, in the parking position a functional device as a lighting device like a courtesy lamp can illuminate an access area to the vehicle, or illuminate a logo, or provide any other functionality that could be operative during parking position.

Preferably, the second part is longer than the first part, so that in the driving position the camera is properly distanced from the vehicle's bodywork to reach a wide field of view. Preferably, the second part is "n" times longer than the first part, wherein "n" is within the range (1.2-4), or more preferably within the range (1.5-3), wherein the length of the first and second parts, is taken from the pivot axis to the free end of each part.

In a preferred implementation of the invention, the assembly incorporates a first light source, such as a blinker lighting device arranged in correspondence with the second part of the casing. More preferably, in a position where the first light source is externally visible. Preferably, the blinker may extend on the lateral surface of the casing, for example on the outermost surface thereof, and it might also extend on the farthest surface of the casing from the pivot axis, wherein the camera is placed.

The camera is adapted to operate with a Camera Monitoring System, CMS, so that the camera is part of a CMS system which further includes a display, a controller and the required connections between them.

Preferably, a second camera, such as 360° field of view camera, is also installed in the second part of the casing, preferably at the surface of the assembly closest to ground when installed in a vehicle, and it is externally visible.

The casing has an outer surface having a first area extending on the first part of the casing, and a second area extending on the second part of the casing. The first and second areas are continuous and inclined in relation to each other.

The assembly has a drive mechanism enclosed in the casing and configured to impart a rotation movement on the casing about the pivot axis, when the casing is operatively mounted at an external structure of a vehicle.

Another aspect of the invention refers to a vehicle, that preferably incorporates a retractable camera wing assembly as the one defined above. The bodywork surface of the vehicle has an opening for receiving the casing of the assembly.

The assembly comprises: a casing fitted with a camera for capturing rear view imagines for a driver of the vehicle, and with at least one electric and/or electronic device. The casing is pivotable through the opening about a pivot axis, between a driving position and a parking position. The pivot axis is located inside the vehicle, that is, behind the vehicle's bodywork. The distance between the pivot axis and the vehicle's bodywork, is shorter than the length of the first part.

The casing is configured such that in the driving position, a portion of the second part of the casing in which the camera is located, is deployed externally from the vehicle's surface, so that the camera is properly positioned for capturing rear view images for assisting a driver to drive the vehicle, and in the parking position the portion of the casing in which the camera is located, is at least partially concealed in the opening, and a portion of the first part of the casing in which the electric and/or electronic device is located, protrudes externally from the vehicle's surface.

Preferably, in the driving position, the part of the first part in which the electric and/or electronic device is located, is concealed in the opening.

Preferably, the casing is configured such that in the parking position, an external surface of the second part of the casing is flush with the vehicle's body surface and at least partially covering the opening, and more preferably, completely covering the opening.

Preferably, the casing is configured such that in the driving position, an external surface of the first part of the casing is flush with the vehicle's surface at least partially covering the opening, and more preferably, completely covering the opening.

More preferably, the casing is configured such that in the driving position, in the parking position and while rotating, the opening is closed by the casing to prevent dirt or water passing through the opening.

BRIEF DESCRIPTION OF THE DRAWINGS

To complete the description and in order to provide a better understanding of the invention, a set of drawings is provided. These drawings form an integral part of the description and illustrate embodiments of the invention, which should not be interpreted as restricting the scope of the invention, but just as examples of how the invention can be carried out. The drawings comprise the following figures.

DETAILED DESCRIPTION

Figure 1A:
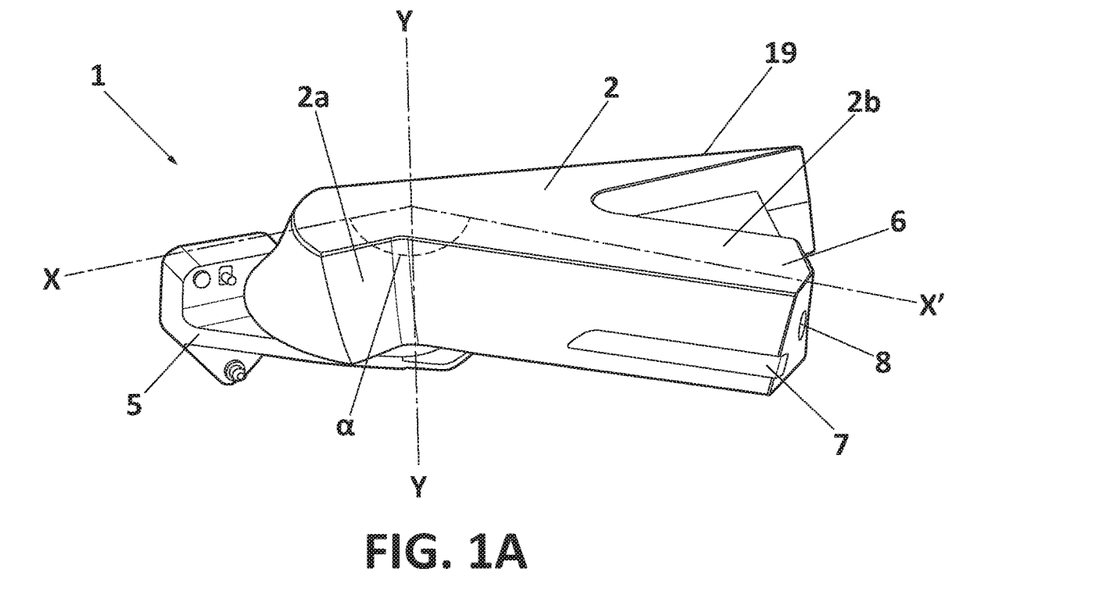
FIG. 1A depicts a retractable camera wing assembly in accordance with a non-limiting example.
Figure 1B:
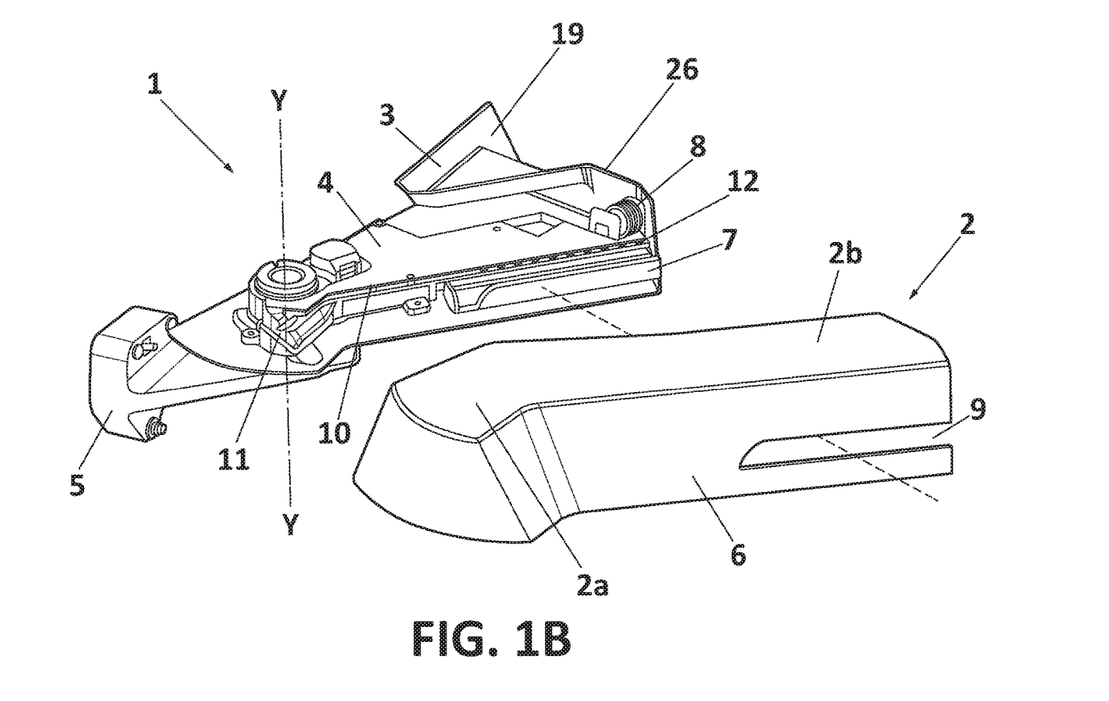
FIG. 1B depicts the retractable camera wing assembly of FIG. 1A with an outer cover removed, in accordance with a non-limiting example.
Figure 2:
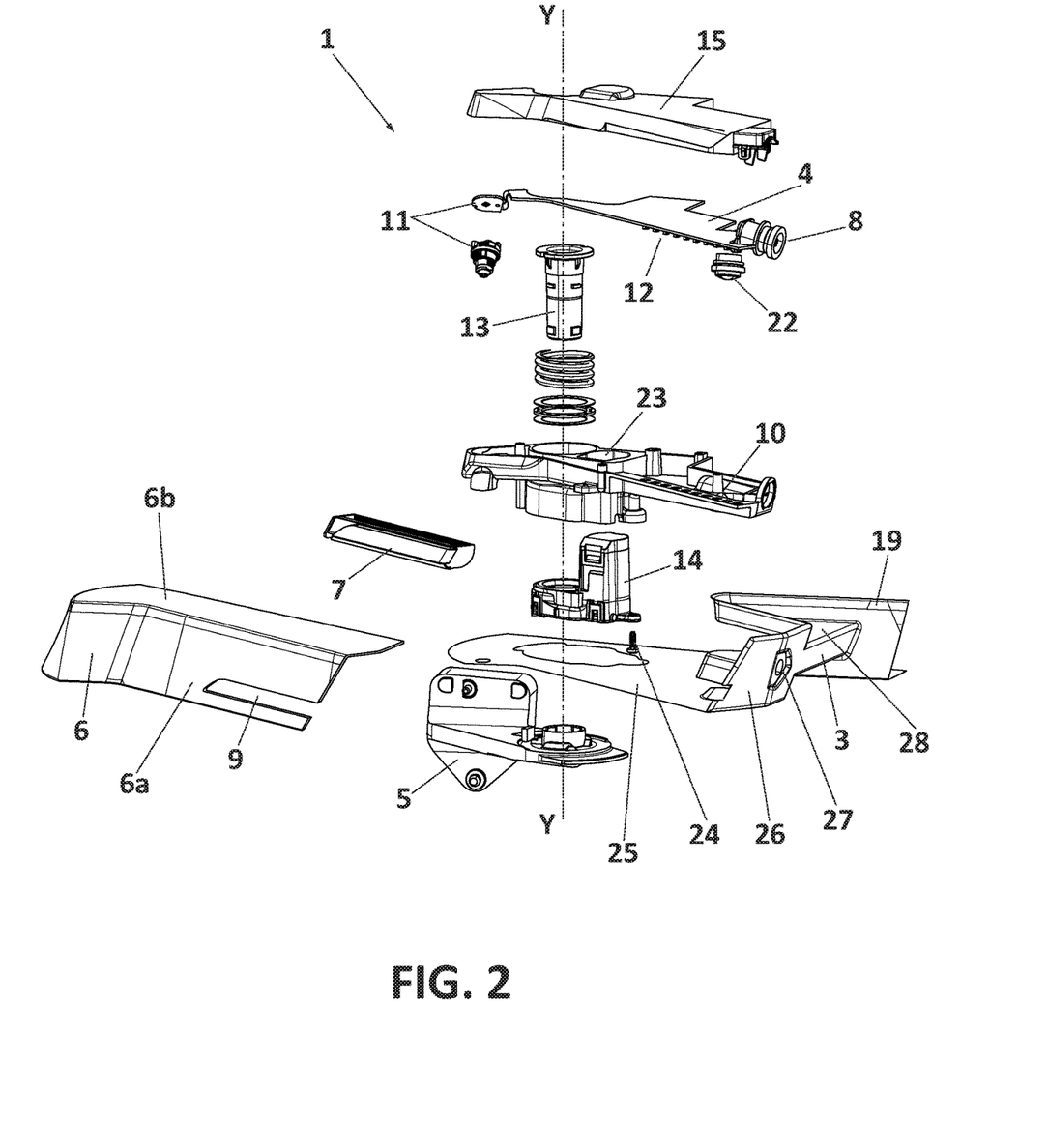
FIG. 2 is a disassembled view of the retractable camera wing assembly of FIG. 1A.

FIGS. 1A, 1B show an exemplary embodiment of a retractable camera wing assembly (1), that comprises a casing (2) formed by an outer cover (6) and a back cover (3) coupled together. As shown in FIG. 2, enclosed inside the casing (2), there are: a bracket (10), a printed circuit board (4) placed on the bracket (10) and having mounted therein: a Camera Monitoring System (CMS) camera (8), a 360° camera (22), a first light source, in this case, a blinker light source (12) and an electric component, which in this example consists of a second light source (11) as a lamp with logo, a puddle lamp, etc. The printed circuit board (4) also includes control means, for example a microcontroller adapted for controlling the operation of one or more of the above listed components mounted on the printed circuit board (4). The control means may be adapted to receive signals from another component of the assembly, and/or from an external component or device to the assembly.

The assembly (1) also includes a blinker lens (7) for the blinker light source (12), which is visible externally through a notch (9) of the outer cover (6).

When all the above-listed components are assembled together, they configure the assembly shown in FIG. 1A. As shown in this figure, the casing (2) defines a pivot axis (Y) such that when the casing (2) is operatively mounted in a vehicle, the casing (2) is pivotable about the pivot axis (Y), for example, the rotation angle of the casing is between the range of 20° and 45°. For that purpose, a support (5) is provided for mounting the casing (2) in a vehicle, so that the support (5) is attached to a vehicle and the casing (2) is pivotably coupled with the support (5).

Also as shown in FIG. 1A, the casing (2) has a first part (2a) extending in a first direction from the pivot axis (Y) in particular extending along a first axis (X), and a second part (2b) extending in a second direction from the pivot axis (Y), in particular along a second axis (X'), so that first and second parts (2a,2b) diverge from each other. The second part (2b) is longer than the first part (2a).

The camera (8) and the first light source, in the example consisting of a blinker light source (12), are placed at the second part (2b) of the casing (2), and the CMS camera (8) is located at the free end of the second part (2b) of the farthest surface of the second part (2b) from the pivot axis (Y), for capturing images through an opening formed therein. The second light source (11) is located at the first part (2a) of the casing (2), and it is visible through another opening (FIGS. 5A and 5B) formed in the first part (2a) or through a transparent area thereof, preferably at the bottom surface of the casing (2) when installed in a vehicle. An upper part of each of FIGS. 5A and 5B corresponds to an interior of a vehicle. Dotted lines represent rotational movement of the first and second parts of the casing.

Figure 6A:
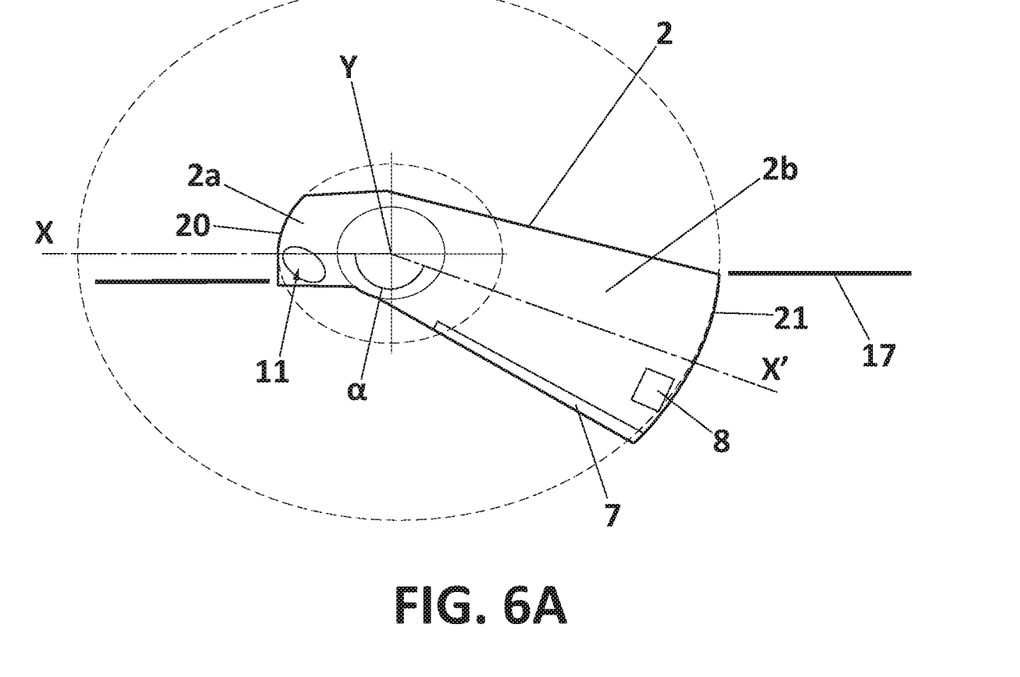
FIG. 6A is a schematic view of the retractable camera wing of FIG. 5A, in accordance with a non-limiting example.
Figure 6B:
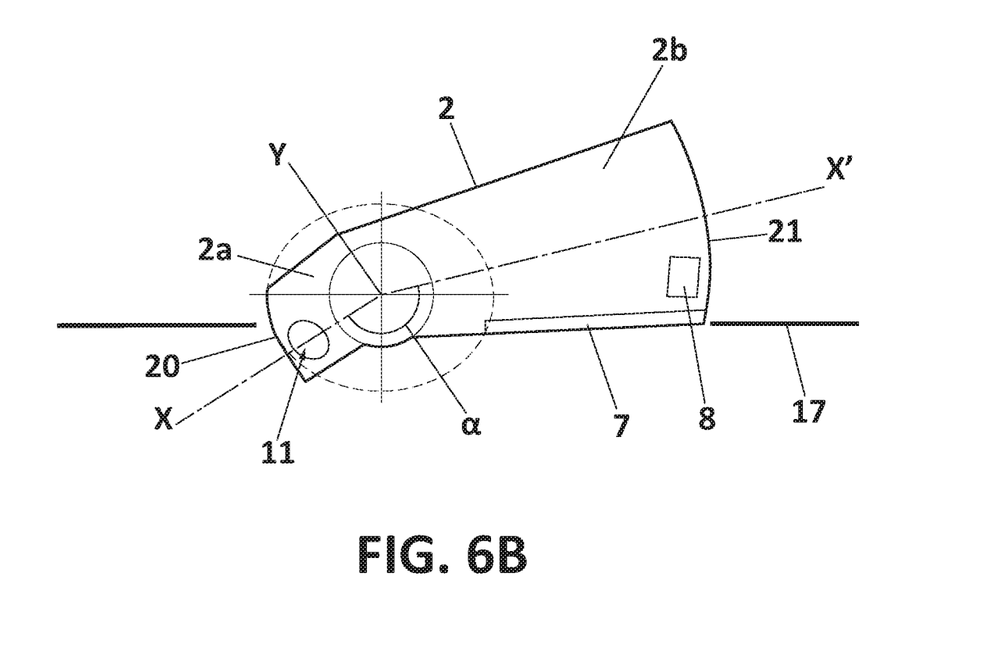
FIG. 6B is a schematic view of the retractable camera wing of FIG. 5B in accordance with a non-limiting example.

As better represented in FIGS. 6A, 6B, first and second parts (2a,2b) are generally coplanar and they are arranged such that they define an angle (α) between them within the range 100°-170°, that is, the angle (α) between axis (X,X') is within said range.

Figure 5A:
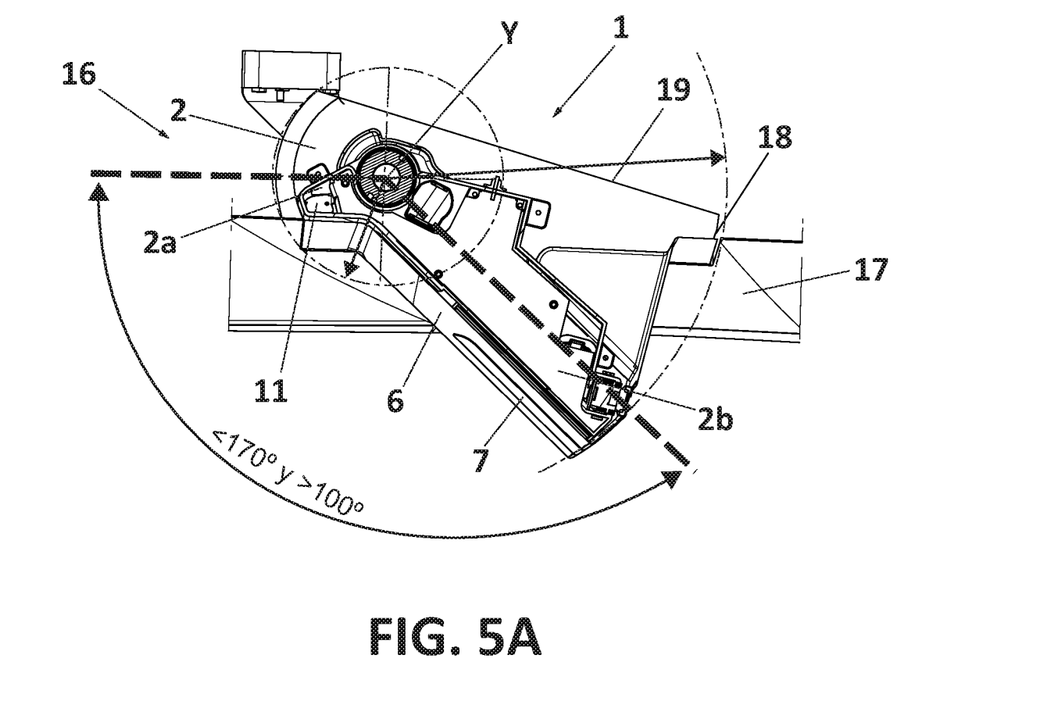
FIG. 5A depicts a bottom plan view of the retractable camera wing assembly in the driving position, in accordance with a non-limiting example.
Figure 5B:
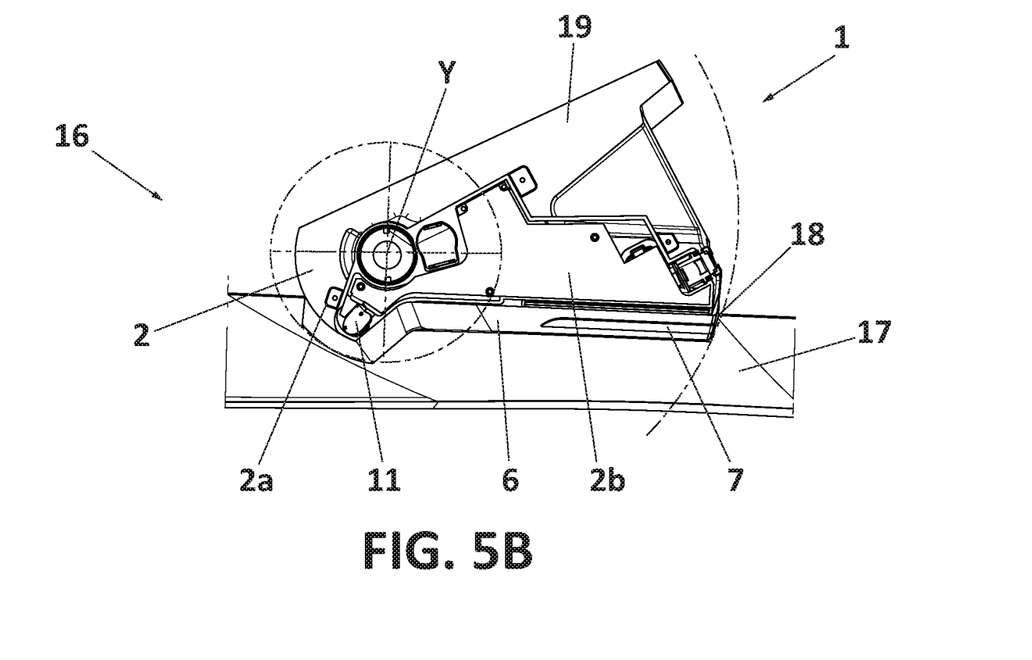
FIG. 5B is a bottom plan view of the retractably camera wing assembly of FIG. 5A in the parking position, in accordance with a non-limiting example.

The arrangement of all the components of the assembly in relation to the axis (Y) is better illustrated in FIG. 2. In addition to the components described above in relation to FIGS. 1A, 1B, the assembly (1) includes a sleeve (13) coaxial with the axis (Y), that attaches the assembly (1) to the support (5), a cover (15), and a drive mechanism (14) attached to the support (5) and a bracket (10) that causes the rotation of the assembly relative to the support (5) between the driving and parking positions, as shown in FIGS. 5a,5b.

The drive mechanism (14) may consist in any type of electric, mechanical or electromechanical actuator, or alternatively it might consist of a manual actuator.

The control means may be adapted also to control the operation of the drive mechanism (14), depending on the precedence of the order to transit to the parking position in a way that, for example, when the driver is inside the vehicle, once an order to transit from the driving to the parking position is received, the control means delays the actuation of the drive mechanism (14) for a certain period, preferably above 30, and more preferably above 60 seconds, to command the drive mechanism (14) to transit to the parking position, keeping the cameras operational during that period, for example while the vehicle is stopped. In other cases, for example when the driver closes the vehicle from outside, the control means orders the drive mechanism (14) to transit to the parking position in a much shorter time period, preferably less than 30 seconds, more preferably less than 10 seconds.

The sleeve (13) attaches the bracket (10) to the support (5), and the drive mechanism (14) is received within a cavity (23) of the bracket (10), and it is attached to the bracket (10) and to the support (5) by means of the same sleeve (13) and/or other elements such as one or more screws (24).

The printed circuit board (4) also includes a 360° camera (22), positioned to capture images all around the assembly (1) when it is installed in a vehicle.

The outer surface of the casing (2) is formed by the outer cover (6), and the back cover (3). Furthermore, the cover (15) together with the bracket (10) configure a watertight compartment for the entire printed circuit board (4) or for a part of it, to prevent water and dust from entering into that compartment.

The back cover (3) has a generally flat surface (25) for accommodating the bracket (10) an opening (not shown) for the 360° camera (22), and end surface (26) with an opening (27) for the camera (8). The back cover (3) also has a back surface (19) which has generally a "V" configuration with a wall (28) inside.

The outer cover (6) has two surfaces, a side surface (6a) and an upper surface (6b), that match with the end surface (26) of the back cover (3) that configure together a casing for enclosing the assembly formed by the bracket (10), the printed circuit board (4), the top cover (15), the sleeve (13) and the drive mechanism (14).

In a preferred implementation, the outer cover (6) extends covering the back cover (3) completely as shown in Figure (la), or partially as shown in Figure (1b).

Figure 3A:
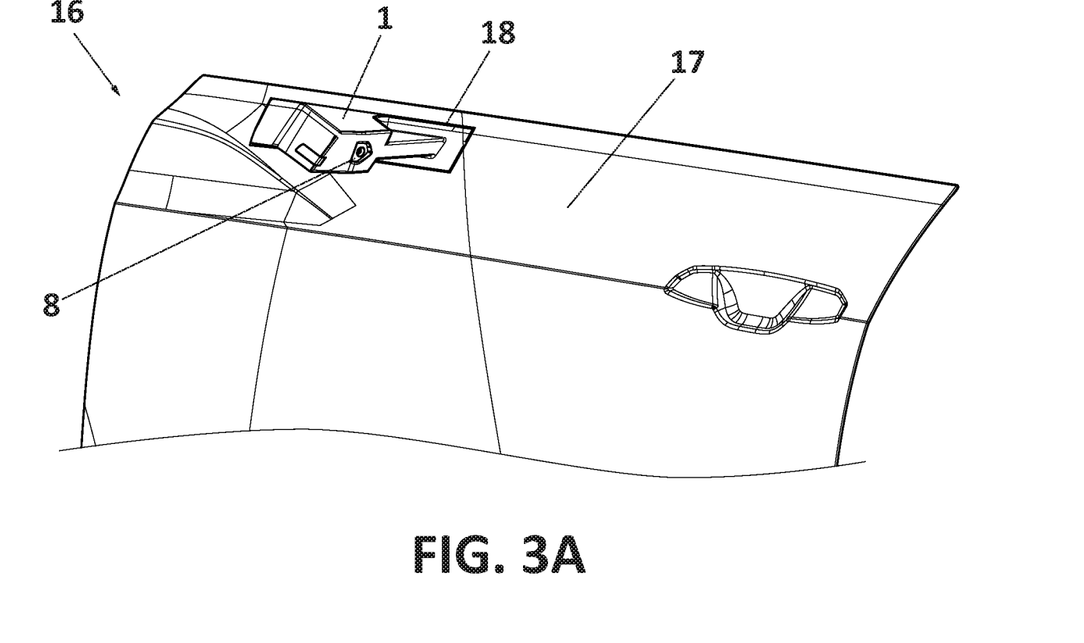
FIG. 3A depicts the retractable camera wing assembly in a driving or deployed position, in accordance with a non-limiting example.
Figure 3B:
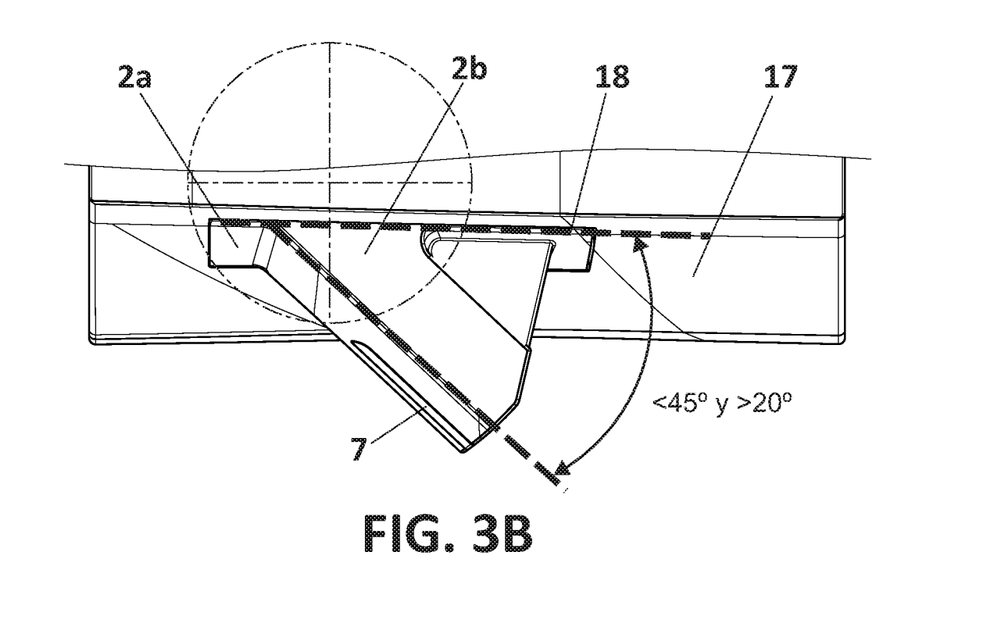
FIG. 3B depicts a top view of the retractable camera wing assembly of FIG. 3A, in accordance with a non-limiting example.
Figure 3C:
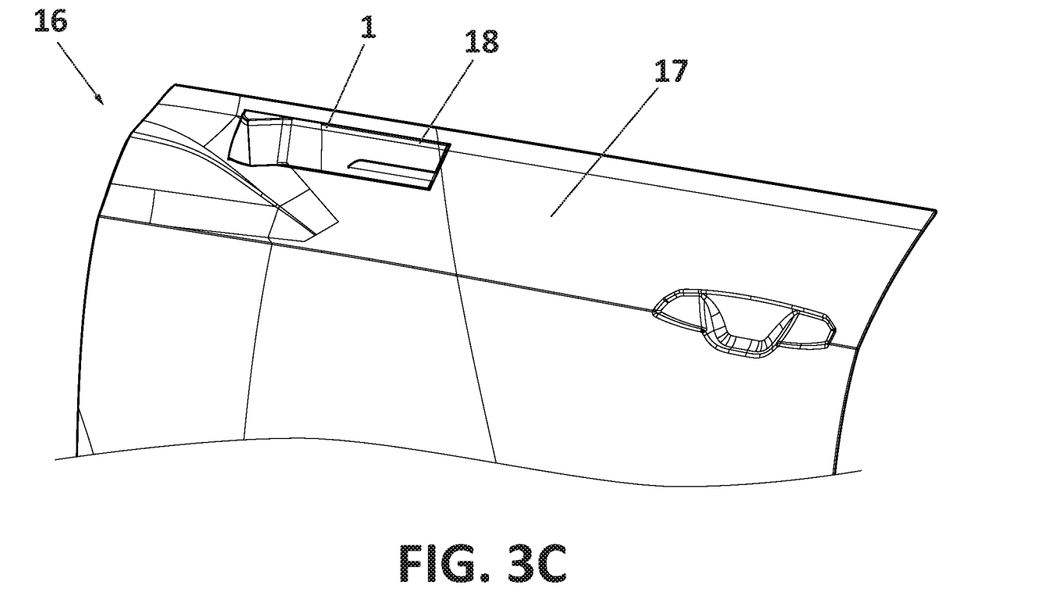
FIG. 3C depicts the retractable camera wing assembly in a parking position, in accordance with a non-limiting example.
Figure 3D:
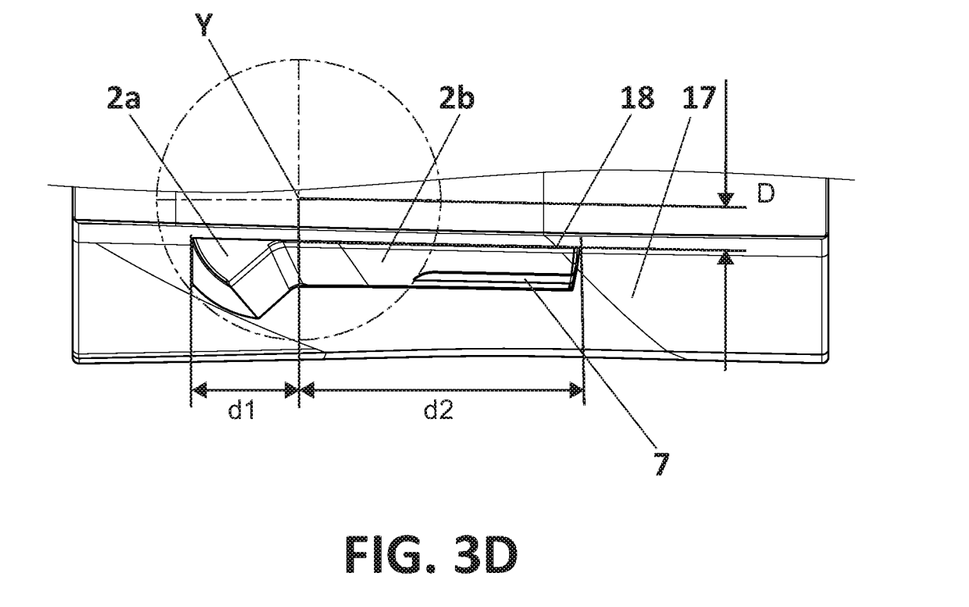
FIG. 3D is a top view the retractable camera wing assembly of FIG. 3C, in accordance with a non-limiting example.
Figure 4A:
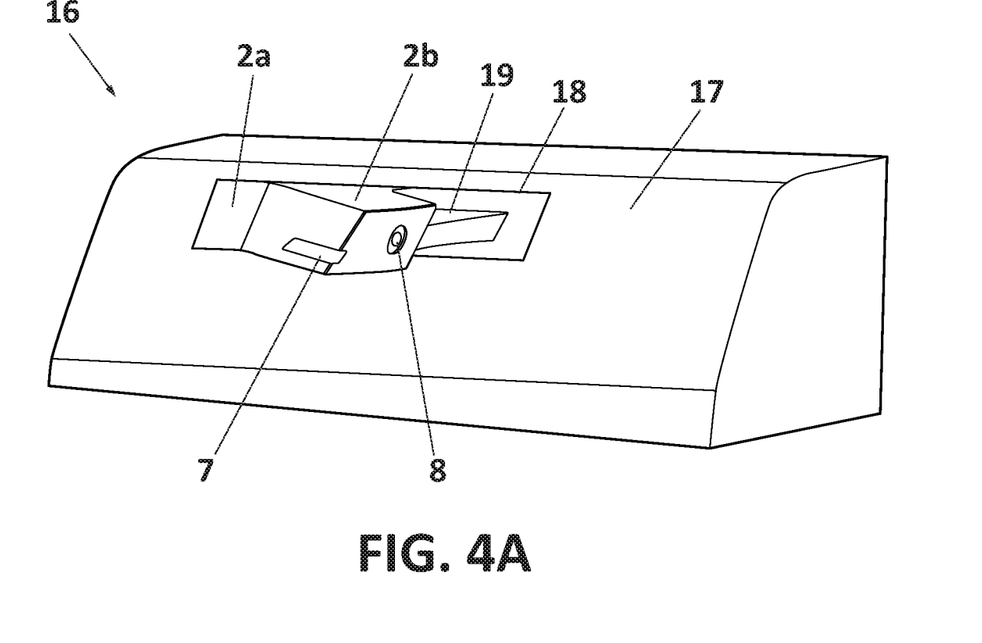
FIG. 4A depicts a detail view of the retractable camera wing assembly in a driving or deployed position, in accordance with a non-limiting example.
Figure 4B:
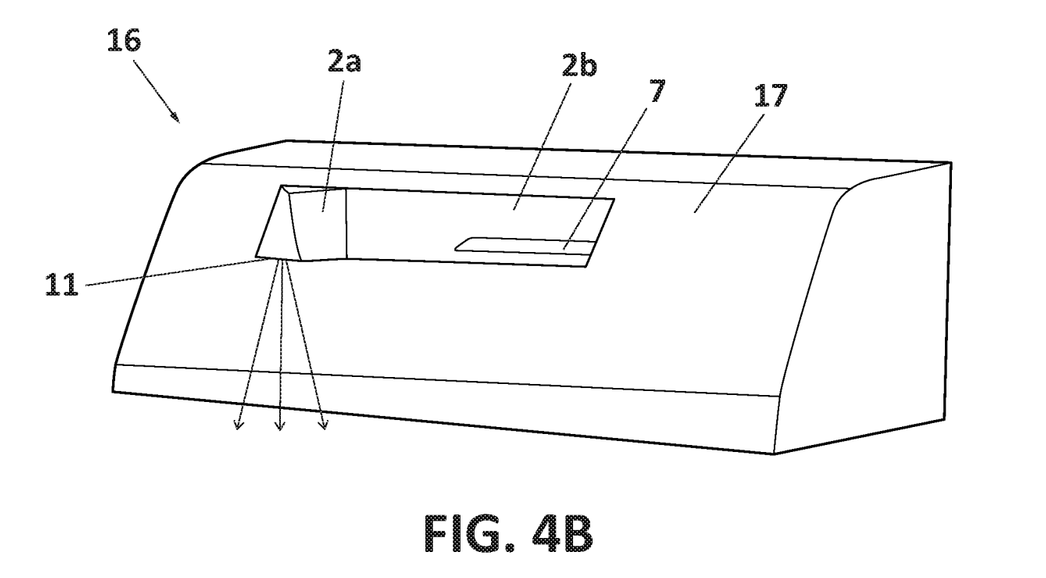
FIG. 4B depicts the retractable camera wing assembly of FIG. 4A in a parking position, in accordance with a non-limiting example.

FIGS. 3 and 4 illustrate another aspect of the invention that relates to a vehicle (16) having a bodywork surface (17) with an opening (18), and a retractable camera wing assembly, preferably the retractable camera wing assembly (1) previously described.

The assembly (1) is pivotably installed at the opening (18), such that it can transit from a driving position (FIGS. 3A, 3B, 4A, 5A, 6A) in which the assembly (1) is deployed externally from the vehicle's surface so that the camera (8) can capture rear view images, and a parking position (FIGS. 3C, 3D, 4B, 5B, 6B) in which the second part (2b) of the casing (2) is concealed in the opening (18) so that the camera (8) is hidden, thus, protected behind the bodywork surface (17) and not operative, and the first part (2a) of the casing (2) or a part of it, protrudes outside the bodywork surface (17). Preferably, in the driving position the first part (2a) of the casing (2) is concealed in the opening (18), and preferably being no operative.

In FIG. 3B, it is shown that the assembly is configured such that the rotation angle of the casing (2) about the axis "Y", is within the range between 20° and 45° for passing from parking to driving position.

In FIG. 3D, it is shown that the second part (2b) is longer than the first part (2a), that is, the distance (d2) is larger than distance (d1), wherein the distances are taken from the pivot axis to the free end of each part (2a,2b). Also in this figure, it can be appreciated that the pivot axis (Y) is located inside the vehicle's bodywork surface (17) at a distance (D) from the bodywork surface (17), and that this distance (D) is shorter than distance (d1) of the first part (2a).

The second light source (11) is located at the first part (2a) of the casing (2), casing (2) that protrudes externally from the bodywork surface (17) in the parking position. Therefore, the second light source (11) can be used to illuminate for example a ground area near an access door to the vehicle (as represented in FIG. 4B), and/or to illuminate a logo or being any other desired functionality depending on the type of electric or electronic device installed therein.

As shown in FIG. 4A, in the driving position the outer surface of the first part (2a) is flush with the bodywork surface (17), and in the parking position as shown in FIG. 4B, the outer surface of the second part (2b) is flush with the bodywork surface (17). The outer surfaces of the first and second parts (2a,2b) are continuous and inclined in relation to each other.

In any case, the casing (2) is configured such that in the driving position and in the parking position, the opening (8) is always closed by the casing (2) in order to prevent dirt or water passing through the opening into the vehicle interior.

This feature is better represented in FIGS. 5A, 5B, wherein it is shown that that the casing (2), preferably the back cover (3) and the back surface (19) are shaped and dimensioned to close the part of the opening (18) corresponding to the first part (2b), especially in the driving position as better shown in FIGS. 4A, and 5A. The part of the opening (18) corresponding to the first part (2a), is closed by the outer cover (6).

FIGS. 6A, 6B shows schematically the pivoting movement of the casing (2) between the driving position (FIG. 6A) and the parking position (FIG. 6B), about pivot axis (Y). It can be noted that the entire volume of the first part (2a) and the second part (2b) are contained within circular areas (delimited by dotted lines) which center is axis (Y), and that the free ends (20,21) respectively of the first and second parts (2a,2b), are, preferably, rounded and at least in part follows the curvature a circumference which center is axis (Y), in order to properly close the opening (18).

What is claimed is:

1. A retractable camera wing assembly for vehicles, the retractable camera wing assembly comprising:
    a casing adapted to be mounted in a vehicle and provided with a camera for capturing rear view imagines for a driver of the vehicle,
    wherein the casing is configured to be pivotable about a pivot axis,
    wherein the casing has a first part extending in a first direction from the pivot axis, and a second part extending in a second direction (X) from the pivot axis, such first and second parts diverge from each other,
    wherein the casing defines a Y-shape between the first part and the second part; and
    wherein the camera is placed at the second part of the casing and the first part of the casing is fitted with at least one electric and/or electronic device.

2. The assembly according to claim 1, wherein first and second parts are arranged such that they define an angle within the range of 100°-170°.

3. The assembly according to claim 1, wherein the second part is longer than the first part.

4. The assembly according to claim 1, wherein the electric and/or electronic device, is at least one a lighting device, a camera, a radar, a lidar, a laser, a sensor, or an antenna.

5. The assembly according to claim 1, wherein the second part has an externally visible turn signal light device.

6. The assembly according to claim 1, wherein the camera is adapted to be part of a Camera Monitoring System (CMS).

7. The assembly according to claim 1, wherein the casing has an outer surface having a first area extending on the first part of the casing, and a second area extending on the second part of the casing, and wherein the first and second areas are continuous and inclined in relation to each other.

8. The assembly according to claim 1, further comprising a drive mechanism enclosed in the casing and configured to impart a rotation movement on the casing about the pivot axis when the casing is operatively mounted at an external structure.

9. A vehicle comprising a bodywork surface having an opening, and a retractable camera wing assembly,
    wherein the assembly comprises a casing pivotable through the opening about a pivot axis, between a driving position and a parking position,
    wherein the casing is fitted with a camera for capturing rear view imagines for a driver of the vehicle, and with at least one electric and/or electronic device, and
    wherein the casing is configured such that in the driving position, a part of the casing in which the camera is located, is deployed externally from the bodywork surface, so that the camera is operational and is positioned for capturing rear view images for assisting a driver to drive the vehicle, and
    wherein in the parking position the part of the casing in which the camera is located, is at least partially concealed in the opening, and another part of the casing in which the electric and/or electronic device is located, protrudes externally from the bodywork surface;
    wherein the first part extends in a first direction from the pivot axis and the second part extends in a second direction from the pivot axis such that first and second parts diverge from each other.

10. The vehicle according to claim 9, wherein in the driving position the part of the casing in which the electric and/or electronic device is located, is concealed in the opening.

11. The vehicle according to claim 9, wherein in the parking position, the electric and/or electronic device is operational.

12. The vehicle according to claim 9, wherein the casing is configured such that in the parking position an external surface of the casing is flush with part of the bodywork surface.

13. The vehicle according to claim 9, wherein the pivot axis is located inside the vehicle.

14. The vehicle according to claim 9, wherein the casing is configured such that in the driving position and in the parking position, the opening is closed by the casing to prevent dirt or water passing through the opening.

15. A retractable camera wing assembly comprising:
    a casing adapted to be mounted in a vehicle and provided with a camera for capturing rear view imagines for a driver of the vehicle;
    wherein the casing is configured to be pivotable about a pivot axis;
    wherein the casing has a first part extending in a first direction from the pivot axis, and a second part extending in a second direction from the pivot axis, such first and second parts diverge from each other;
    wherein the camera is placed at the second part of the casing and the first part of the casing is fitted with at least one electric and/or electronic device;
    wherein the casing is pivotable through an opening in the vehicle, between a driving position and a parking position,
    wherein the casing is configured such that in the driving position, the second part is deployed externally from the vehicle, so that the camera is operational and is positioned for capturing rear view images for assisting a driver to drive the vehicle, and wherein in the parking position the second part is at least partially concealed in the opening and the first part protrudes externally from the bodywork surface.

16. The retractable camera wing assembly of claim 15, wherein the camera in parking position is not operable.

17. The retractable camera wing assembly of claim 15, wherein the first part in paring position is deployed.

18. The retractable camera wing assembly according to claim 17, wherein the first part comprises an electric and/or electronic device.

19. The retractable camera wing assembly according to claim 18, wherein the electric and/or electronic device is operable in parking device.

20. The retractable camera wing assembly according to claim 18, wherein in the driving position the part of the casing in which the electric and/or electronic device is located, is concealed in the opening.

* * * * *